Figures 1, 2:
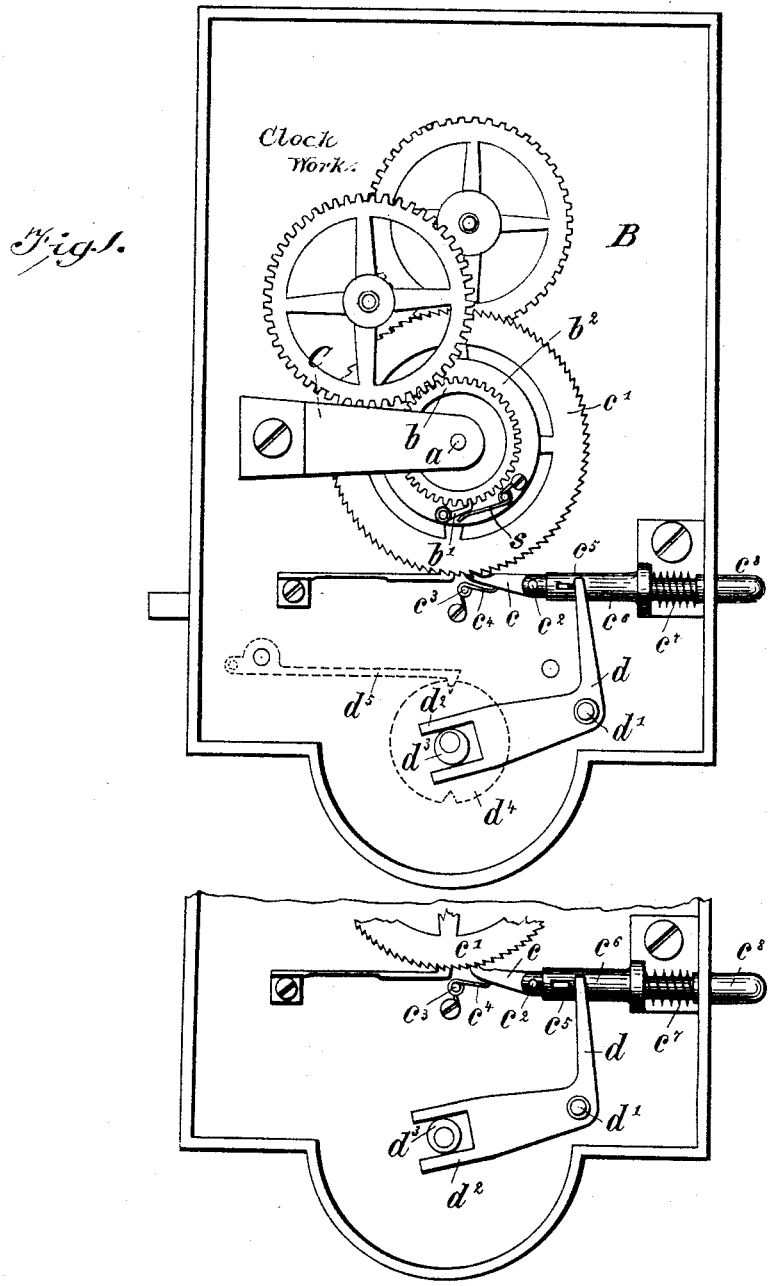

(No Model.) 3 Sheets—Sheet 1.

F. D. DENCKER & F. ERHARDT.
FARE REGISTERING APPARATUS.

No. 450,602. Patented Apr. 14, 1891.

Witnesses,
J. Rogers Barker

Inventors,
Ferdinand Daniel Dencker
and Friedrich Erhardt
By Paine & Ladd, att'ys.

(No Model.) 3 Sheets—Sheet 2.

F. D. DENCKER & F. ERHARDT.
FARE REGISTERING APPARATUS.

No. 450,602. Patented Apr. 14, 1891.

(No Model.) 3 Sheets—Sheet 3.
F. D. DENCKER & F. ERHARDT.
FARE REGISTERING APPARATUS.
No. 450,602. Patented Apr. 14, 1891.
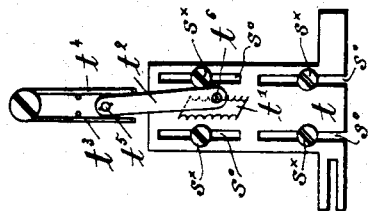
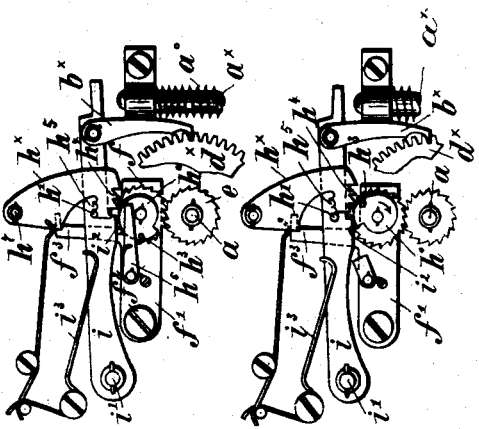
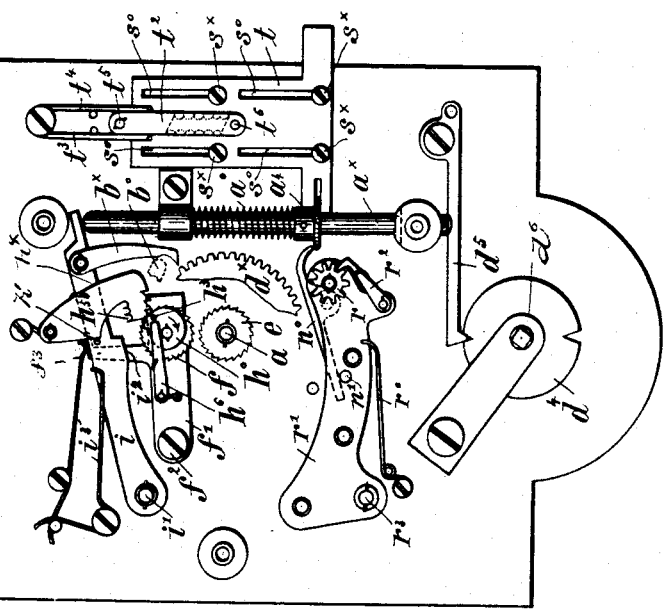
Witnesses.
Inventors,
Ferdinand Daniel Dencker
Friedrich Erhardt
By Paine & Ladd
attys.
THE NORRIS PETERS CO., PHOTO-LITHO., WASHINGTON, D. C.

UNITED STATES PATENT OFFICE.

FERDINAND DANIEL DENEKER AND FRIEDRICH ERHARDT, OF HAMBURG, GERMANY, ASSIGNORS TO THE TAXAMETER-FABRIK WESTENDARP & PIEPER, OF SAME PLACE.

FARE-REGISTERING APPARATUS.

SPECIFICATION forming part of Letters Patent No. 450,602, dated April 14, 1891.

Application filed July 15, 1890. Serial No. 358,786. (No model.)

*To all whom it may concern:*

Be it known that we, FERDINAND DANIEL DENEKER, a subject of the German Emperor, and FRIEDRICH ERHARDT, a subject of the King of Hungary, both residing at Hamburg, in the German Empire, have invented certain new and useful Improvements in Fare-Indicating Apparatus, of which the following is a specification.

Our invention relates to improvements in apparatus for automatically indicating the fare due on a cab or other public conveyance according to time and distance; and the objects of these improvements are, first, to construct the apparatus so that as long as the vehicle is standing still or not traveling beyond a certain speed the amount of the fare will be registered according to time by a clock-work; but when the vehicle is traveling over a certain speed the mechanism deriving its motion from the wheel or axle of the vehicle, which is independent of the clock-work, will overhaul the speed of the latter, indicating the fare by the pointer and registering the same according to the distance traveled; second, to provide means for varying the speed of the mechanism operated by the wheel or axle of the vehicle to indicate different units of fare—*e. g.*, for night and day, or single and double fare; third, to provide means for operating the pointer, so that it will show the minimum fixed amount which is to be paid for every journey, however short, while in the case of longer journeys the full length of distance or the entire lapse of time for which the minimum charge is paid must first be accomplished before the pointer advances to control the remainder; fourth, to disengage the entire indicating mechanism from the main driving-shaft of the apparatus when the vehicle is not on hire; fifth, to cause the various mechanisms to return to the zero-point and disengaging them; sixth, to provide mechanisms producing a check action for preventing the partial to-and-fro motion of the disengaging-bolt, and, seventh, to provide a controlling device for the driver of the vehicle which shall register the total amount of the fares taken during a certain space of time. We attain these objects by the mechanisms illustrated in the accompanying drawings, which form part of this specification, and in which similar letters denote similar parts throughout the several views.

Figure 4:
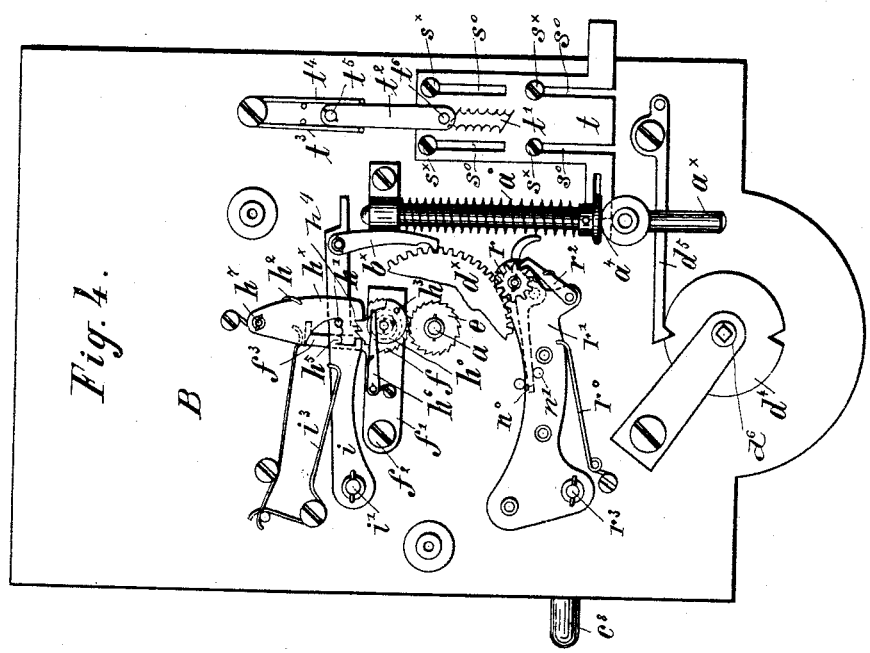
Figure 3:
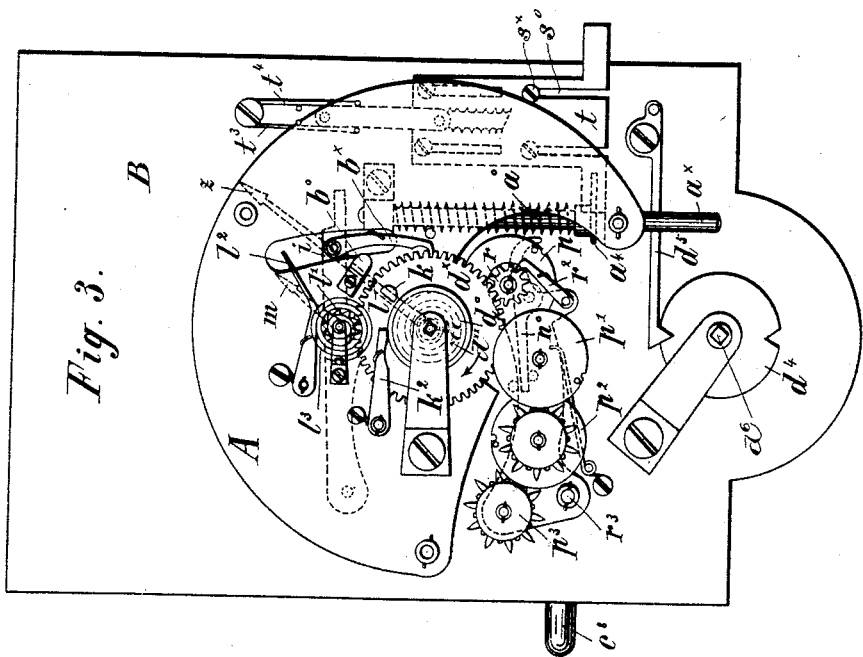

Figure 1 is a back elevation of the apparatus; Fig. 2, a partial back elevation showing the eccentric and lever for adjusting the mechanism for night or double fares; Fig. 3, a front elevation showing the pointers in dotted lines, the dial-plates being removed for the sake of greater clearness. Fig. 4 is the same elevation, but with an intermediate plate and the mechanism mounted thereon removed for the sake of greater clearness in showing the mechanism for indicating the minimum fare at the beginning of each journey. Fig. 5 shows the same elevation as in Fig. 4, with the mechanism disengaged from the main driving-shaft and the disengaging-bolt at its highest point when the vehicle is not in hire. Figs. 6 and 7 show the mechanism for indicating the minimum fare separately drawn in two different positions. Fig. 8 is a detail view of the check mechanism for preventing the partial upward or downward movement of the disengaging-bolt.

Referring to Fig. 1, $a$ is the main shaft of the apparatus mounted in the main frame B, and a bracket C connected thereto, Fig. 1. The ratchet-wheel $c'$ and disk $b^2$ are keyed onto this shaft, while the cog-wheel $b$ is loosely mounted thereon. A ratchet $b'$, upon which bears a spring $s$, is pivoted to the disk $b^2$ and gears into the cog-wheel $b$. The ratchet-wheel $c'$ is operated in two ways: First, by a clock-work gearing into the cog-wheel $b$, which drives the shaft $a$ by means of the ratchet $b'$ and disk $b^2$; second, by means of the sliding ratchet $c$, guided in the socket $c^6$ of the frame-plate B by the sliding rod $c^8$, projecting beyond the frame for the purpose of connecting to the mechanism operated by the wheel or axle of the vehicle. The ratchet $c$ is pivoted to the slide-rod $c^8$ at $c^2$, and held constantly against wheel $c'$ by a spring $c^4$, mounted on pin $c^3$. The stroke of the slide-rod of the ratchet is limited by a pin $c^5$ in the slide projecting into a slit in the socket or guide-tube $c^6$. The forward stroke of the said rod $c^8$ is preferably effected through the intermediation of any convenient means by a cam on the nave of a cab-wheel, the backward stroke by the spring $c^7$. The stroke of the slide-rod is, however, capable of modification, for at night-time, or in the case of double fares if two, three, or more persons are traveling, the shaft $a$ must turn more quickly in order to show a higher charge for the same distance. To accomplish this an angle-lever $d$, pivoted at $d'$ to the frame B, is arranged, the end $d^2$ of which has a broad slit in which an eccentric is situated, which is mounted on a shaft containing a disk $d^4$, having a corresponding number of notches into which a spring-catch $d^5$ snaps. The upper end of the lever $d$ is adapted to partially cover the slit in the guide-tube $c^6$ during the day-time or with single fares, while at night-time or for double fares on turning the eccentric round, which may be effected by a key passed over its square-ended shaft $d^6$, Fig. 3, the slit will be uncovered and the slide-rod $c^8$ and ratchet $c$ can make a full stroke, turning the ratchet-wheel $c'$, say, about three teeth at every revolution of the cab-wheels instead of two, thus showing the charge fifty per cent. higher. The catch $d^5$ and the notches in the disk $d^4$ simply insure the eccentric being in the proper position.

As long as the cab is standing still or has not attained a certain speed the ratchet-wheel $c'$ will be operated by the clock-work previously mentioned through the cog-wheel $b$, ratchet $b'$, and disk $b^2$; but as soon as it begins to travel over a certain speed the slide-rod $c^8$ drives the ratchet-wheel faster, so that it overhauls the clock-work while the ratchet $b'$ is simply sliding away over the cog-wheel $b$, and the price will then be marked according to the distance run by the cab.

To the main driving-shaft $a$ is attached, in front of the main frame B, a small cog or ratchet wheel $e$, Fig. 4, which is continually revolved by means of the shaft $a$, in the manner previously described. A cog or ratchet wheel $f$, which drives the whole indicating mechanism, gears into the said cog or ratchet wheel $e$. The former is mounted in a lever $f'$, pivoted at $f^2$ to the frame B. The arm or lever $f'$ has a secondary arm $f^3$ projecting upward, and having a hook on its upper end, the object of which is that when the arm $i$, pivoted at $i'$, is pushed upward by the disengaging-bolt $a^\times$ it may catch under the hook of the secondary arm $f^3$, thereby raising the lever $f'$ and disengaging the two cog or ratchet wheels $f$ $e$, thus arresting the whole mechanism, which depends on the motion of the cog or ratchet wheel $e$ as long as the vehicle is not on hire.

The arm $i$ is provided with a pawl $b^\times$ at its end, which engages with cog-wheel $d^\times$, mounted in the plate A. When the disengaging-bolt $a^\times$ is elevated to its full extent, compressing spring $a^0$, the pawl $b^\times$ slides over the teeth of the cog-wheel $d^\times$, owing to projection $b^0$, which is so placed as to guide the pawl properly back into the teeth when the disengaging-bolt is lowered, so that the cog-wheel $d^\times$ will be revolved the proper distance as soon as another hirer enters the vehicle. As the pointer $z$ is attached to the spindle of the cog-wheel $d^\times$, it will thus be moved a certain distance at the beginning of each journey, showing the minimum fare which is to be paid in any case. The distance, however, corresponding to the minimum price must first be run before the pointer proceeds farther. From this point on the hand $z$ is operated from the main driving-shaft $a$ by the cam $h^0$ on the spindle of the cog or ratchet wheel $f$, lever-arm $i$, and ratchet $b^\times$ in the following manner.

The arm $i$, which is constantly pressed downward under the influence of a spring $i^3$, rests with its projection $i^2$ on the outer surface of the cam $h^0$, the form of which may be clearly seen from Figs. 4, 5, 6, and 7. This cam on being revolved operates the arm $i$ upward to a certain point, when the latter is suddenly let fall. At the upward movement of the arm $i$ the ratchet $b^\times$ will slide over the teeth of the cog-wheel $d^\times$; but at the descent of the arm the cog-wheel $d^\times$ will be revolved a certain distance. It is necessary, however, before the pointer proceeds, that the distance or time corresponding to the minimum fare, already shown by the apparatus, should be accomplished. For this purpose a toothed segmental arm $h^\times$ is suspended at $h^7$ above the arm $i$, the number of teeth of said segmental arm corresponding with the minimum fare which is in any case to be paid, and is supposed in the present example to be three. It is further provided with a recess in its side containing a corresponding number (three) of notches $h^5$, in which a pin $h'$ of the arm $i$ fits. The arm $h^\times$ is continually pressed against the pin $h'$ by a spring $h^2$. On lowering the disengaging-bolt $a^\times$ the pin $h'$ of the arm $i$ will be arrested in the recess of the arm $h^\times$, Fig. 4, while on raising the bolt $a^\times$ the pin $h'$ will push the arm $h^\times$ aside, Fig. 5. As may be seen from Fig. 4, when the pin $h'$ is suspended out of reach of the cam $h^0$ the segmental arm $h^\times$ retains the arm $i$ until the distance or time corresponding to the minimum fare has been accomplished by the following device: Cam $h^0$ contains a pin $h^3$ at its front, which as the cam revolves comes against the teeth $h^4$ of the arm $h^\times$, pushing the same backward against the influence of the spring $h^2$. As soon as the arm $h^\times$ is removed one tooth farther back the pin $h'$ passes out of one notch $h^5$ into the next. At last pin $h'$ arrives at the last notch, when at the next revolution it falls out of the recess. By this time the shortest fare has been accomplished, and the arm $i$ now lies with its projection $i^2$ on the cam $h^0$, by which it will be operated, as described, moving the pointer $z$. The cog-wheel $d^\times$ is provided with a small pin $l$ near circumference, Fig. 3, which at each revolution of $d^\times$ gears into the wheel $l'$, moving it one tooth farther. Wheel $l'$ has a check-ratchet $l^2$ and a spring $l^3$, by which, as soon as released from the check-ratchet, it is brought back to the zero-point. The pointer $m$ is attached to the spindle of the wheel $l'$, which pointer shows the number of the revolutions made by pointer $z$, or the amounts corresponding to the same. The total fare will thus be the amount shown by the pointer $m$ plus that shown by $z$.

In order to register the revolution of cog-wheel $d^\times$ for controlling the coachman, the said cog-wheel gears into a pinion $r$, mounted in an arm $r'$, pivoted at $r^3$ and having a check-pawl $r^2$. A wheel $p$ is attached to the spindle of pinion $r$, which drives the counting-wheels $p'$ $p^2$ $p^3$, Fig. 3, which are of the ordinary construction and need no further description here. The whole counting mechanism is mounted on the arm $r'$. The dials of the counters are in front of the counting-wheels and visible from the outside of the apparatus through apertures of the main dial-plate, and are not shown in the drawings; but their location can be understood from Fig. 3. The check-pawl $r^2$ of the pinion $r$ serves simultaneously as a check for the cog-wheel $d^\times$, which has in its boss a spring $d^{\times\times}$, having the tendency to bring the wheel back to its zero-point as soon as it is released from the check-ratchet. This spring $d^{\times\times}$ (indicated by dotted lines, Fig. 3) is of the ordinary construction, and is so arranged that as soon as the wheel $d^\times$ has completed a revolution it snaps over, so that said wheel will never be turned back more than a certain fraction of one revolution. Thus as soon as the driving-pinion $r$ is removed from the cog-wheel $d^\times$ the latter will return to its zero-point under influence of the spring just mentioned. The pointer $z$ and the cog-wheel $d^\times$ are arrested at the zero-point by a pin $k$ on the face of the cog-wheel, and a stop $k^2$, pivoted to the plate A and held down on the projecting circular spring-barrel $d^0$ of the cog-wheel $d^\times$ by a suitable spring. As long as $d^\times$ revolves in its proper direction the pin $k$ lifts the stop $k^2$ at each revolution, passing under it; but on springing back to the zero-point, the pin $k$ meets against the butt-end of the stop $k^2$, and thereby arrests the return motion of the cog-wheel.

As it is necessary simultaneously with the cog-wheel $d^\times$ to bring the wheel $l'$ of the pointer $m$ and the cam $h^0$ back to their zero-points, the plate A is provided with a projection, against which a pin fixed in the back of the wheel $l'$ strikes as soon as the check-ratchet $l^2$ has been removed. The wheel $l'$, as previously mentioned, returns to its zero-point under influence of the spring $l^3$. The fact that the wheel $l'$ cannot make a full revolution, owing to the arrangement of the stops, should be taken into consideration in constructing the apparatus, so that the largest sum which it is possible to take in one day should be represented on the small dial by less than one complete revolution of the pointer $m$.

The cam $h^0$, which is attached to the cog-wheel $f$ is provided with a spring-barrel, (indicated by dotted lines, Fig. 4,) in the same way as the cog-wheel $d^\times$. It contains, further, as heretofore mentioned, a pin $h^3$, which, when the cam revolves in its proper direction, lifts the latch $h^6$, which is pivoted to the arm $f'$ and pressed downward by a spring and passes under it; but on swinging back under the influence of the spring in its boss as soon as the wheel $f$ is disengaged, the pin strikes the end of the latch $h^6$, being thereby arrested at its zero-point.

The whole mechanisms, with the exception of the counters $p$ $p'$ $p^2$ $p^3$, are brought back to their zero-points by shifting the disengaging-bolt $a^\times$ upward, when its upper end strikes the arm $i$, raising it and the ratchet $b^\times$, which is thereby disengaged from its wheel $d^\times$. On raising the arm $i$ the pin $h'$, which projects through the arm on both sides, pushes with its front end the segmental arm $h^\times$ back, falling into the recess $h^5$ in the same, while its backward projection catches under the hook of the upward-extending branch $f^3$ of the arm $f'$. On being raised still further, Fig. 5, the arm $f'$ is elevated, thus disengaging the cog or ratchet wheel $f$ from the cog-wheel $d^\times$, while the boss of the ratchet $b^\times$, which projects through the front plate $t$, strikes the projecting finger of the ratchet $l^2$, raising the latter, and consequently disengaging the ratchet-wheel $l'$, which returns to its zero-point with the pointer $m$ under influence of the spring $l^3$. At this point the ratchet $b^\times$ comes against the projection $b^0$, which opposes the action of its spring. The projection $b^0$ is so placed as to guide the ratchet directly into position in the teeth of wheel $d$ when the disengaging-bolt is released. Lastly, the counting or controlling mechanism is also disengaged. The collar $a^4$ on the disengaging-bolt $a^\times$ engages the lever $n^0$, which is pivoted to the frame, Fig. 5. The other end of lever $n^0$ acts on a pin $n'$ in the arm $r'$, pressing the same downward round its pivot $r^3$, and thereby disengaging the pinion $r$ from the cog-wheel $d^\times$. The arm $r'$ on being released from the pressure of the lever $n^0$ is actuated upward by spring $r^0$.

When the disengaging-bolt $a^\times$ is lowered again under the influence of the spring $a^0$ at the beginning of a journey, the pinion $r$ gears into the cog-wheel $d^\times$. The ratchet $b^\times$ then engages the cog-wheel $d^\times$, releasing the ratchet $l^2$, which engages the wheel $l'$. The pointer cog-wheel $d^\times$, and with it the pinion $r$ of the controlling mechanism, are moved round corresponding to the minimum fare, while the toothed segmental arm $h^\times$ is released and can swing back, catching the pin $h'$ of the arm $i$ and allowing the cog-wheel $f$ to engage with the cog-wheel $l$, which has been continuously driven by the clock-work in the meantime.

The various mechanisms are now all at work, operated either by the clock-work or from the wheel of the vehicle by means of the slide-rod $c^8$ and the mechanism previously described. The price corresponding to the journey will be indicated by the hands $z$ and $m$ and simultaneously registered on the counter $p\ p'\ p^2\ p^3$.

In order to prevent defrauding the hirer, as was frequently done in older instruments, by working the disengaging-bolt up and down, but within the limits of the minimum price, whereby the pointer-wheel could be moved round while the cab was waiting, the mechanism about to be described has been arranged. This mechanism prevents the disengaging-bolt from being partially moved upward and downward unless the same is caused to make a whole stroke up or down. As will be evident from this description, every double stroke of the disengaging-bolt will register the minimum fare on the counter, which the driver will have to account for to his employer, so that every intentional or unintentional double stroke of the disengaging-bolt when the cab is unoccupied will cost the driver the amount of the minimum fare. With this object in view the shoulder $a^4$ engages in a slide $t$, vertically guided up and down by the screws $s^\times$ and the notches $s^0$. The sliding plate $t$ contains the rack $t'$, Fig. 8, the top and bottom ends of which are slanted off parallel to each other. A swinging lever $t^2$ is suspended to the frame on its pivot $t^5$, and is actuated by two springs $t^3\ t^4$, both tending to hold the lever $t^2$ in a vertical position. When the disengaging-bolt $a$ is moved from the position in Fig. 4 to that in Fig. 5, the pin $t^6$ in the swinging lever $t^2$ will slide down the slanting top of the rack $t'$ and over the teeth at the right-hand side. If it be now attempted to drive the disengaging-bolt back in the middle of its stroke, the pin $t^6$ will be arrested in the respective teeth of the rack $t'$. The bolt must first descend its full stroke, when the pin $t^6$ can pass over the lower slanting end of the rack and ascend on the other side. Here again it is impossible to move it downward in the middle of the stroke, as the pin $t^6$ will be again arrested. The springs $t^3\ t^4$ hold the pin $t^6$ against the teeth on both sides of the rack. The disengaging-bolt $a^\times$ can thus only be moved from one end position into the other, whereby the pointers are either returned to their zero-points or show the minimum tax, which is then registered on the counter.

We are aware of the Patents No. 183,960, of October 31, 1876, and No. 383,758, of May 29, 1888, to W. F. Needler, and therefore do not claim this combination broadly.

We claim as our invention—

1. In an automatic fare-indicator for vehicles, a main shaft $a$, having loosely mounted thereon a cog-wheel $b$ and a ratchet-wheel $c'$ keyed onto it, cog-wheel $b$ being so connected to the ratchet-wheel $c'$ by ratchet $b'$ that when the cog-wheel $b$ is revolving faster than wheel $c'$ it shall revolve the latter, and thus the shaft $a$, but when the speed of $c'$ overhauls that of $b$ the shaft $a$ shall be driven by $c'$, $b$ continuing to revolve at its normal speed, in combination with a clock-work for driving $b$ and the mechanism for driving $c'$, consisting of the ratchet $c$, engaging the wheel $c'$, and mounted on the slide-rod $c^8$, operated by the cab-wheel, and spring $c^7$, having a pin $c^5$, guiding in a slit in guide-tube $c^6$, ratchet $c$ being operated against the wheel $c'$ by a spring $c^4$, wheel $c'$ having a check-ratchet, substantially as and for the purpose set forth.

2. In an automatic fare-indicator for vehicles, the combination of the main shaft $a$, its driving mechanism, the lever $d$, cam $d^3$, the disk secured on the spindle of said cam, provided with notches, the spring-catch $d^5$, said catch being designed to engage said notches, guide-tube $c^6$, having a slot, the slide-rod $c^8$, and pin $c^5$, substantially as set forth, said lever $d$ being adapted to cover or uncover said slot and thereby shorten or lengthen the stroke of rod $c^8$ through the medium of pin $c^5$, as stated.

3. In combination with the constantly-revolving shaft $a$, a cog-wheel $e$, keyed thereon and adapted to engage in a cog-wheel $f$, mounted on an arm $f'$, pivoted at $f^2$ and containing upwardly-extending branch $f^3$, as specified, a cam $h^0$, rigidly attached to the cog-wheel $f$ and revolving with it, said cam $h^0$ operating a lever $i$, pivoted at $i'$ to the frame-plate and suspending a ratchet $b^\times$ for operating the pointer-wheel $d^\times$, cam $h^0$, adapted to be returned to its zero-point on wheel $f$, being disengaged from the wheel $e$ by a spring mounted in its boss, and the stop $h^6$, pivoted to the arm $f'$ and actuated downward by a spring and arresting said cam $h^0$, when it swings back, by a pin $h^3$, mounted in the side of $h^0$, which, when the cam is revolving in the right direction, raises the stop $h^6$, passing under it, substantially as and for the purpose specified.

4. In combination with a constantly-revolving shaft $a$, driving a cam $h^0$ by intermediate connections, as described, a toothed segmental arm $h^\times$, suspended to the frame-plate by pivot $h^7$, having a recess $h^5$ in its side containing notches for the reception of a pin $h'$ of the arm $i$, the teeth of the segment being adapted to engage round pin $h^3$ of the cam $h^0$, said segment-arm so operated by its spring $h^2$ that when the arm $i$ is lowered, after being raised by the disengaging-bolt $a^\times$, it shall catch the pin $h'$ of the arm $i$ in its recess $h^5$ and retain it there, thus holding the arm $i$ off cam $h^0$ until the pin $h^3$ of the cam $h^0$, which operates the segmental arm one tooth back at each revolution, shall have released the arm $i$, said segmental arm being checked by the pin $h'$, which falls into each notch in its recess in succession, substantially as and for the purpose set forth.

5. In combination with a continually-revolving shaft $a$ and intermediate mechanism for operating the pointer $r$, wheel $d^\times$, as specified, a stop $b^0$, mounted on the intermediate plate $t$ and adapted to disengage the ratchet $b^\times$ from the wheel $d^\times$ when the arm $i$ is moved upward by the disengaging-bolt, retaining said ratchet in such a position as to insure its proper engagement with the wheel $d^\times$ when the arm $i$ is again lowered, $d^\times$ having returned in the meantime to its zero-point, substantially as described.

6. In combination with a continually-revolving shaft $a$ and intermediate mechanism for revolving the pointer-wheel $d^\times$, a cog-wheel $l'$, operated by a pin in the periphery of $d^\times$, engaging in its teeth, as specified, said cog-wheel $l'$ operating a pointer $m$ and having check-ratchet $l^2$, provided with an extension, whereby it is adapted to be disengaged by the boss of the ratchet $b^\times$ when the arm $i$ is raised, said wheel $l'$, on being disengaged from the check-ratchet $l^2$, being returned to its zero-point by a spring $l^3$, and a stop in the frame-plate against which a pin $l'$ strikes, substantially as and for the purpose set forth.

7. In combination with a constantly-revolving main driving-shaft $a$ and intermediate mechanism for revolving the cog-wheel $d^\times$, as specified, a pinion $r$, mounted on arm $r'$, pivoted at $r^3$ to the frame-plate, said pinion gearing into and driven by the said cog-wheel $d^\times$, having, further, a check-ratchet $r^2$ and operating the controlling counting mechanism $p\ p'\ p^2\ p^3$, as described, when in contact with $d^\times$, said complete counting mechanism mounted on said arm $r'$ and adapted to be disengaged from $d^\times$ by a lever $n^0$, pivoted so that when its one end is raised by a collar on the disengaging-bolt $a^\times$ its other end shall depress the arm $r'$ against the tendency of a spring $r^0$, substantially as and for the purpose specified.

8. In combination with a constantly-revolving shaft $a$ and intermediate mechanism for revolving the pointer-wheel $d^\times$, a spring mounted in the boss thereof and adapted to operate $d^\times$ back to its zero-point, but to snap over at each complete revolution, thus only operating it back that fraction which has been made over the last complete revolution, a stop $k^2$, pivoted to the plate $t$, and depressed by a spring which arrests $d^\times$ at its zero-point by pin $k$, mounted on $d^\times$ when the latter is released from the pinion $r$ and check-ratchet $r^2$, the pin $k$ being adapted to lift the stop $k^2$ and pass under it when $d^\times$ revolves in its proper direction, all parts operating in combination, substantially as and for the purpose specified.

9. In combination with a constantly-revolving shaft $a$ and intermediate mechanism, as specified, for revolving the pointers $z$ and $m$, a disengaging-bolt $a^\times$, guided on the frame-plate and depressed by a spring $a^0$, adapted to engage with its upper end under the arm $i$, raising the same and disengaging the ratchet $b^\times$, as specified, arm $i$, having spring $i^3$, which depresses it when released by the bolt $a^\times$, and arm $i$ further having a pin $h'$, extending through on both sides of it and engaging with its backward extension under the hook branch $f^3$ of the arm $f$, said disengaging-bolt $a^\times$ having a collar $a^4$, adapted to operate the lever $n^0$, disengaging pinion $r$, as specified, and releasing $d^\times$, all parts operating in combination, substantially as and for the purpose specified.

In testimony that we claim the foregoing as our invention we have signed our names, in presence of two witnesses, this 24th day of May, 1890.

FERDINAND DANIEL DENEKER.
    FRIEDRICH ERHARDT.

Witnesses:
  ALEXANDER SPECHT,
  JULIUS THIEDC.

It is hereby certified that the name of the first-named patentee in Letters Patent No. 450,602, granted April 14, 1891, for an improvement in "Fare Registering Apparatus," was erroneously written and printed "Ferdinand Daniel Deneker," whereas said name should have been written and printed *Ferdinand Daniel Dencker;* and that the said Letters Patent should be read with this correction therein that the same may conform to the record of the case in the Patent Office.

Signed, countersigned, and sealed this 1st day of September, A. D. 1891.

[SEAL.]

CYRUS BUSSEY,
*Assistant Secretary of the Interior.*

Countersigned:
    N. L. FROTHINGHAM,
        *Acting Commissioner of Patents.*